(12) United States Patent
Rankin

(10) Patent No.: US 6,289,769 B1
(45) Date of Patent: Sep. 18, 2001

(54) ELECTROMAGNETIC NUTRUNNER SOCKET COLLAR

(75) Inventor: Brent Rankin, Lima, OH (US)

(73) Assignee: Honda of America Mfg., Inc., Marysville, OH (US)

( * ) Notice: Subject to any disclaimer, the term of this patent is extended or adjusted under 35 U.S.C. 154(b) by 0 days.

(21) Appl. No.: 09/456,295

(22) Filed: Dec. 8, 1999

(51) Int. Cl.$^7$ ........................................................ B25B 17/00
(52) U.S. Cl. ............................. 81/57.31; 81/55; 81/57.13
(58) Field of Search ........................... 81/57.31, 55, 57.13

(56) References Cited

U.S. PATENT DOCUMENTS

| | | |
|---|---|---|
| 4,437,362 * | 3/1984 | Hurst . |
| 4,663,998 | 5/1987 | Parsons et al. . |
| 4,987,806 | 1/1991 | Lehnert . |
| 5,005,654 * | 4/1991 | Moriki et al. . |
| 5,076,120 * | 12/1991 | Lin . |
| 5,181,575 * | 1/1993 | Maruyama et al. . |
| 5,499,540 | 3/1996 | Whaley et al. . |
| 5,603,248 | 2/1997 | Eggert et al. . |
| 5,916,340 | 6/1999 | Forsyth . |

* cited by examiner

Primary Examiner—Timothy V. Eley
Assistant Examiner—Willie Berry, Jr.
(74) Attorney, Agent, or Firm—Arent Fox Kintner Plotkin & Kahn, PLLC

(57) ABSTRACT

A bolt retaining device for a nutrunner which includes a socket having a longitudinal axis and being sized to fit the bolt, the device having an electromagnet positioned with respect to the socket to generate a magnetic field directed along the axis of the socket to hold the bolt in the socket when the field is present, and a controller connected to the electromagnet controlling the magnetic field. The bolt retaining device wherein the electromagnet is a coil co-axially mounted with respect to the socket. Each nutrunner can include a motor, a socket, and a shaft connecting the motor to the socket. One or more nutrunners can be provided on a movable frame.

17 Claims, 3 Drawing Sheets

ELECTROMAGNETIC NUTRUNNER SOCKET COLLAR

BACKGROUND OF THE INVENTION

The present invention relates to an accessory for a nutrunner for making the same particularly efficient for use in an automated assembly/disassembly system. More particularly, the present invention is a bolt retaining device in the form of an electromagnetic collar for the socket for an automated nutrunner.

Nutrunners are devices that are generally known in the art both as hand tools and as motor-driven tools for applying and securing nuts on bolts or removing nuts from bolts or for driving and securing bolts or removing bolts to assemble and/or disassemble workpieces.

During assembly and disassembly processes, it is sometimes necessary to remove bolts from the workpiece being assembled or disassembled. During an automated or a semi-automated process, machines with motor driven sockets are used to loosen or tighten bolts on the workpiece being assembled or disassembled as that workpiece moves down the assembly line. The nutrunner generally includes a motor, a socket with an appropriate size opening for the bolt to be loosened or driven with the motor being connected to the socket via a flexible extensible shaft Often plural nutrunners are mounted on the same stand with the plural sockets being carried by a frame. The frame is independently movable toward and away from the workpiece rolling along the assembly line. The assembly line can be either a continuous flow process in which the plural nutrunners on the frame are carried along at the same speed as the workpiece for as long as it takes to perform the desired operation or the assembly line can be a station by station line in which the workpiece moves into a particular station and remains there until the operations to be performed there are completed. In any event, the socket of the nutrunner through other operating structure is moved to advance toward the workpiece having the bolt to be tightened or removed and is movable away from the workpiece.

In certain assembly line processes, workpieces such as internal combustion engines are assembled at a separate location and brought to the assembly line to be assembled with the additional components and then assembled into the vehicle. For protective purposes, openings on the internal combustion engine where later components are to be assembled, are covered by a cap during shipment or movement from the engine assembly plant to the vehicle assembly line. Such a cap could be the cap covering the opening at the end of the engine adjacent the main bearing where the crankshaft is designed to be connected to the clutch or transmission. Such caps are typically held in place by bolts that are engaged in the threaded holes that the final assembly bolts will engage. Such bolts must be loosened and taken out and the cap removed prior to the engine being assembled with the remaining components. Generally, plural bolts are provided for holding on a specific cap. Each of these bolts must be loosened and removed in order to remove the cap prior to the subsequent assembly of the engine with the other components. Originally the bolts were loosened and removed by pneumatically-driven hand-held nutrunners by individual workers.

In a more modem plant, as the engine moves down the assembly line, the motor driven socket machine advances the motor driven sockets onto the bolts to be loosened. The engine is appropriately positioned and the sockets are appropriately mounted on the frame to mate with a single movement of the sockets toward the bolts. The individual motors are turned on for a specific amount of time required to loosen the bolt. The frame of the motor driven socket machine then retracts from the engaged position and disengages the sockets from the loosened bolts. The engine then moves further down the assembly line where the loosened bolt(s) are removed by a worker.

During the loosening of the bolt, the head of the bolt moves within or along inside the bore of the socket or the socket moves slowly backwardly against the biasing of a spring as the bolt unthreads out of the hole. At present, there is no secure structure for holding the bolt within the socket upon the retreat of the plural socket carrying frame should the bolt be loosened far enough to come out of the hole. This creates a problem of bolts dropping to the floor of the assembly line if they have been unloosened too far.

Various socket type hand tools are known in which a permanent magnet is provided for holding the nut or bolt head therein to facilitate putting it into an operable position by manipulating the wrench or handle upon which the socket is fitted. Examples are shown in U.S. Pat. No. 4,663,998 to Parsons et al, U.S. Pat. No. 5,603,248 to Eggert et al or U.S. Pat. No. 5,916,340 to Forsyth. In each of these, a permanent magnet is held at the base of the bore of a socket. The magnet can be held in place by a C-clip in a peripheral wall groove formed in the inner circumference of the socket, or by a circular retainer interference fit in the base of the bore of the socket above the magnet or by being imbedded or connected to a socket wrench connector tip insertable in a driver bore of a manual socket.

One of the difficulties in using a nut driver in an automated or semi-automated process for driving a bolt or nut is to be able to sense or measure the amount of torque being applied to the bolt or nut. It is often desired to have a specific preload on a bolt or nut. Bolts having an improper preload can lead to a catastrophic failure of a critical component. One known method is to monitor the applied torque on the socket such as in the system shown in U.S. Pat. No. 4,987,806 to Lehnert. The torque is monitored by a strain gauge affixed to the drive shaft of the motor and arranged to provide a signal proportional to the applied torque. Another structure is taught in U.S. Pat. No. 5,499,540 to Whaley et al in which a device for measuring the load on the bolt includes an electromagnetic acoustic transducer comprising a magnet and a coil located in the interior space of the socket near the bolt head. The signal is taken out of the coil by a slip ring assembly engaged around the socket drive. The magnet provided is a permanent magnet.

Providing a permanent magnet in a socket of a conventional nutrunner would require special design and expensive retooling of standard sockets. Further, providing a permanent magnet in a socket of a conventional nutrunner may assist in assembling nuts onto a stud or assembling bolts into a unit moving along an assembly line by preholding the nuts or bolts and thereafter advancing the nutrunner into position. However, such is not the case with a nutrunner used for disassembly.

In designing an automated or a semi-automated disassembly process, various factors need to be considered. The particular bolts encountered may have variations in the bolt head such that the provision of a permanent magnet may not provide a magnet strong enough to hold the bolt when the bolt is completely removed from the hole. Further, difficulties may be encountered due to contamination on the bolt head becoming clogged or stuck in the socket and weakening the magnetic field by distancing the bolt head from the permanent magnet. Any attempt to increase the strength or size of the permanent magnet would increase the difficulty of releasing or removing the bolt from the socket following the disassembly of the bolt from the workpiece on the assembly line. A further mechanism, such as a pin push release mechanism, would be required. Further, variations in bolt length due to changes in the assembly line would require changes in the permanent magnet so that sufficient magnetic field strength is provided to hold the bolt in the socket. Thus, not only would specially designed and provided sockets be required, a plurality of field strengths for the same size socket would be required and multiple socket shifts would be needed as product lines were changed.

OBJECTS AND SUMMARY OF THE INVENTION

It is an object of the present invention to provide a nutrunner especially suited for a disassembly process.

It is another object of the present invention to provide a nutrunner having a magnetic field coupled with the socket to retain a bolt or nut that is being taken off of a workpiece on an assembly line and enable simple and easy removal of that bolt or nut from the socket by a collapse of the magnetic field.

It is a further object of the present invention to provide a nutrunner having a magnetic field coupled therewith in which the strength of the field can be varied as required for the particular application without changing the physical structure.

It is still a further object of the present invention to provide a nutrunner with a magnetic field associated with the socket in which a special socket is not required. That is, it is an object to enable a nutrunner to use a standard socket with the present invention.

It is yet another object of the invention to provide a method of automated or semi-automated disassembling of an object on an assembly line using a nutrunner with a controllable magnetic field associated with the socket.

The above and other objects are obtained in a nutrunner comprising the structure disclosed herein.

In one aspect, the present invention includes a bolt retaining device for a nutrunner having a socket having a longitudinal axis and being sized to fit the bolt. The device comprises an electromagnet positioned with respect to the socket to generate a magnetic field directed along the axis of the socket to hold the bolt in the socket when the field is present, and a controller connected to the electromagnet controlling the magnetic field.

The electromagnet can be a coil co-axially mounted with respect to the socket.

The device can further comprise a locking sleeve connected to the socket, a rotatable bearing mounted on the locking sleeve, and a casing mounted on the bearing, the electromagnet being provided in the casing.

The device can have the electromagnet be mounted on the socket and the device can further comprise a slip ring assembly on the socket electrically interconnecting the electromagnet with the controller.

The electromagnet can comprise a coil surrounding the axis of the socket. The controller can comprise a first relay having first contacts connected in series with the coil, a second relay interposed between the first relay and the coil, and a current limiting device, with the second relay having multiple second relay contacts including a first position connecting power from the first relay directly to the coil and a second position reversing polarity of the connection across the coil, and with the current limiting device being connected in series with the coil when the second relay contacts are in the second position.

Alternatively, the controller can comprise a first relay having first contacts connected in series with the coil, and a diode connected in parallel with the coil, whereby when the relay is energized, current flows through the coil generating the magnetic field and as the relay is de-energized, the diode prevents arcing across the first contacts from a reverse EMF spike as the magnetic field collapses.

In a second aspect, the present invention is a nutrunner for a bolt or nut comprising a motor, a socket having a longitudinal axis and being sized to fit the bolt or nut connected to be rotated by the motor, and a bolt retaining device for the bolt or nut. The bolt retaining device can comprise an electromagnet positioned with respect to the socket to generate a magnetic field directed along the axis of the socket to hold the bolt in the socket when the field is present, and a controller connected to the electromagnet controlling the magnetic field.

In this nutrunner, the electromagnet can be coaxially mounted with respect to the socket.

This nutrunner can further comprise a bracket connected to the socket, a rotatable bearing mounted on the bracket, and a casing mounted on the bearing, the electromagnet being provided in the casing.

This nutrunner can have the electromagnet comprise a coil surrounding the axis of the socket, and the controller comprise a first relay having first contacts connected in series with the coil, a second relay interposed between the first relay and the coil, and a current limiting device, with the second relay having multiple second relay contacts including a first position connecting power from the first relay directly to the coil and a second position reversing polarity of the connection across the coil, and with the current limiting device being connected in series with the coil when the second relay contacts are in the second position.

Alternatively, in this nutrunner, the controller can comprise a relay having contacts connected in series with the coil, and a diode connected in parallel with the coil, whereby when the relay is energized, current flows through the coil generating the magnetic field and as the relay is de-energized, the diode prevents arcing across the contacts from a reverse EMF spike as the magnetic field collapses.

This nutrunner can further comprise an extensible shaft interconnecting the motor and the socket, a frame rotatably carrying the socket, the frame being movable toward and away from a workpiece, means for moving the frame toward and away from the workpiece, a mounting bracket on the frame, and a collar mounting flange on the bracket, the electromagnet being mounted on the collar mounting flange, the controller being mounted on the frame, the electromagnet and the controller being carried by the frame during the movement toward and away from the workpiece.

In a third aspect, the present invention is a disassembly device for removing bolts or nuts from a workpiece on an assembly line. This device can comprise a base positioned adjacent the assembly line, plural nutrunners mounted on the base, each nutrunner comprising a motor, a socket having a longitudinal axis and being sized to fit the bolt or nut connected to be rotated by the motor, an extensible shaft interconnecting the motor and the socket, and a bolt retaining device for the bolt or nut comprising an electromagnet positioned with respect to the socket to generate a magnetic field directed along the axis of the socket to hold the bolt in the socket when the field is present, and a controller connected to the electromagnet controlling the magnetic field, a frame mounted on the base and rotatably carrying the sockets of the plural nutrunners, the frame being movable toward and away from the workpiece, means for moving the frame toward and away from the workpiece, a mounting bracket on the frame, and a plurality of collar mounting flanges on the bracket, each electromagnet being mounted on one collar mounting flange, each controller being mounted on the frame, the electromagnets and the controllers being carried by the frame during the movement toward and away from the workpiece.

This disassembly device can have each electromagnet be co-axially mounted with respect to a respective socket.

This disassembly device can further comprise a locking sleeve connected to the respective socket, a rotatable bearing mounted on the locking sleeve, and a casing mounted on the bearing, the electromagnet being provided in the casing.

This disassembly device can have the electromagnet comprise a coil surrounding the axis of the socket, and the controller comprise a first relay having first contacts connected in series with the coil, a second relay interposed between the first relay and the coil, and a current limiting device, with the second relay having multiple second relay contacts including a first position connecting power from the first relay directly to the coil and a second position reversing polarity of the connection across the coil, and with the current limiting device being connected in series with the coil when the second relay contacts are in the second position.

In a fourth aspect, the present invention is a method of disassembling a part from a body traveling on an assembly line, the part being held on the body by a nut or bolt. The method comprises advancing a nutrunner socket to engage the nut or bolt, engaging the nut or bolt, activating an electromagnetic field around the socket, retracting the socket while rotating the socket to unthread the bolt or nut, and deactivating the magnetic field after the bolt or nut has been completely disengaged from the body.

This method, where the part is held on the body by plural nuts or bolts, can further comprise providing plural nutrunners equal in number to the number of the plural nuts or bolts, and simultaneously carrying out the method with all of the plural nutrunners.

This method can further comprise applying a reverse magnetic field to the socket after the magnetic field has been deactivated.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
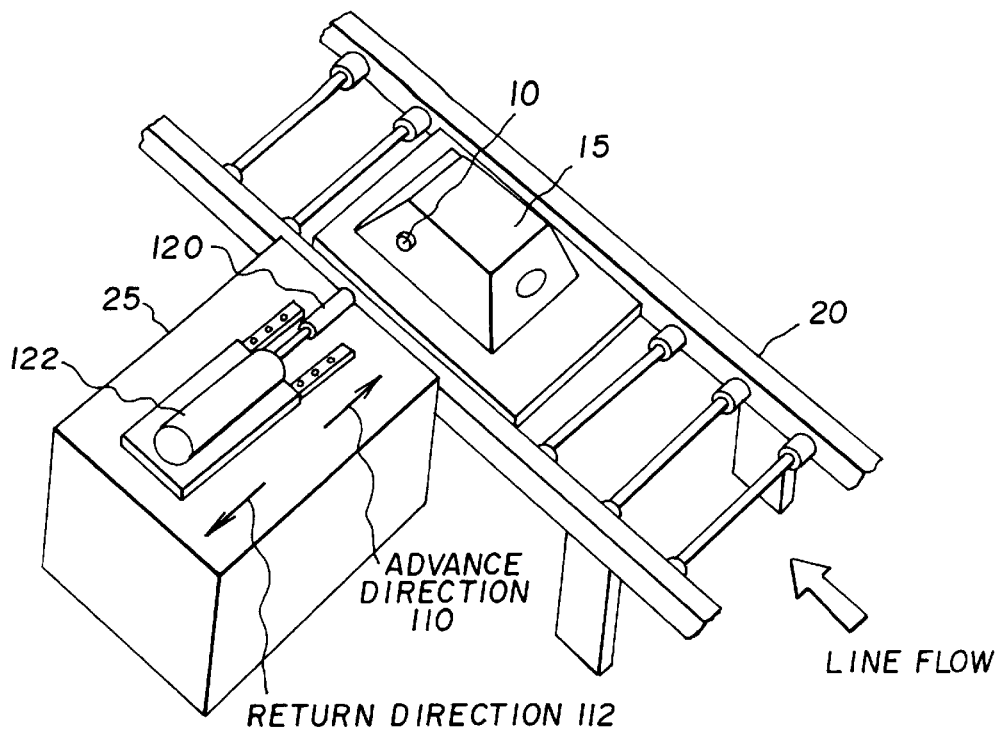
FIG. 1 shows a diagrammatic sketch of a nutrunner and an assembly line for the purpose of description of the environment of the present invention.

During assembly and disassembly processes, it is sometimes necessary to remove bolts 10 from the workpiece 15 being assembled or disassembled. In automated and semi-automated assembly and disassembly processes as shown in FIG. 1, machines 100 with motor driven sockets 120 are used to loosen the bolts 10 from the workpiece 15 being assembled or disassembled as the workpiece 15 moves down an assembly line 20.

As the workpiece 15 moves down the assembly line 20, the motor driven socket machine 100 advances the motor driven socket 120 in the direction 110 toward the workpiece 15 onto the bolt 10 to be loosened. The motor 122 is turned on for a specific amount of time required to loosen the bolt 10. The motor driven socket machine 100 then retracts the motor driven socket 120 in the direction 112 away from the workpiece 15. The workpiece 15 then moves further down the assembly line 20 where the loosened bolt 10 is removed by a worker.

The following describes the present invention which is a bolt retaining device in the form of an electromagnetic nutrunner socket collar 130 to allow automatic removal of the bolt 10 (by the motor driven socket machine) once the bolt 10 has been loosened.

Figure 2A:
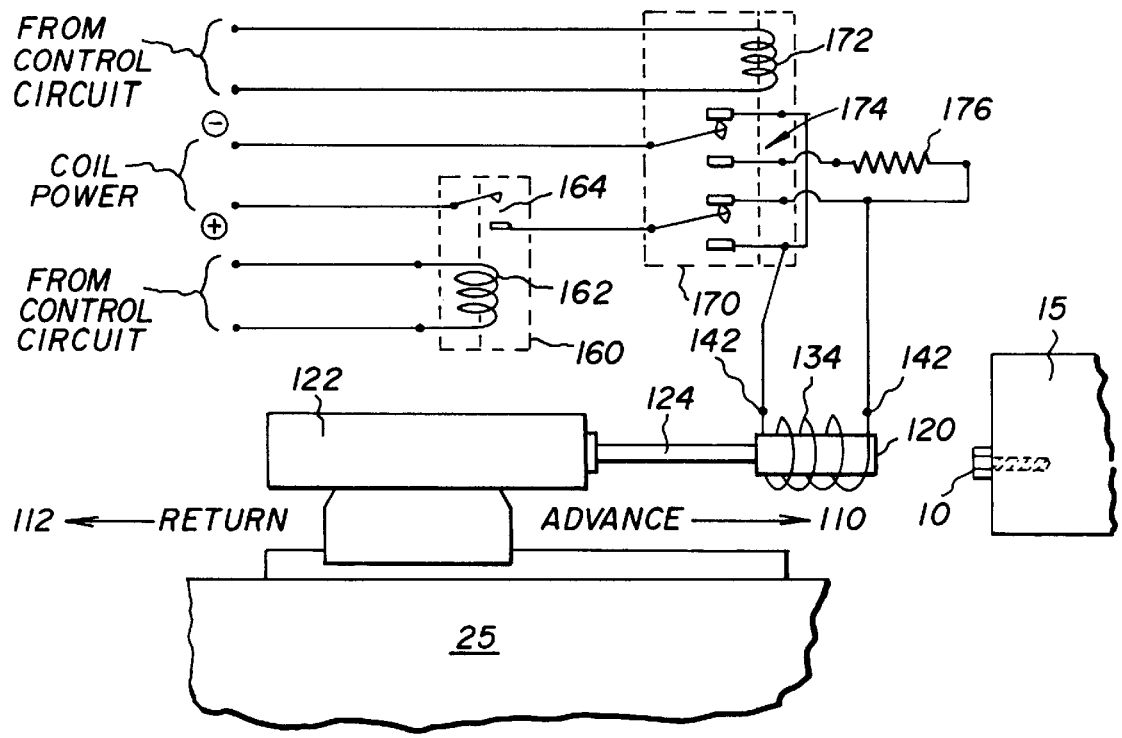
FIG. 2A shows diagrammatic view of a nutrunner in accordance with a first embodiment of the present invention together with a schematic of a first control circuit therefor.

Referring to FIG. 2A, the motor driven socket 120 is surrounded by a coil 134 of magnet wire. A controller 220 is provided which in the first embodiment comprises first and second relays 160, 170. The first relay 160 is used to control power to the coil 134 and can be controlled by any one or more of a variety of methods such as a computer, or other types of control circuits, as well as switches and other relays. When the first relay 160 is energized (by supplying current to relay coil 162), the first relay contact 164 closes and supplies power to the coil 134 surrounding the motor driven socket 120. When the coil 134 is energized, a magnetic field 150 (FIG. 3) is generated in the socket 120.

When the first relay 160 is de-energized by removing the current from relay coil 162, the first relay contact 164 opens, stopping the current flow to the electromagnetic socket collar coil 134 causing the magnetic field 150 in the socket 120 to collapse. When the magnetic field collapses, a residual field remains in the socket because of the magnetic permeability of the socket. A second relay 170 is provided between the first relay 160 and the coil 134. Relay coil 172 of second relay 170 is energized operating second relay contacts 174, and the coil power polarity is reversed and redirected through a current limiting resistor 176. When first relay 160 is re-energized, a limited current flows to the coil 134 of the collar and generates a reverse field cancelling the residual field remaining in the socket 120.

Figure 2B:
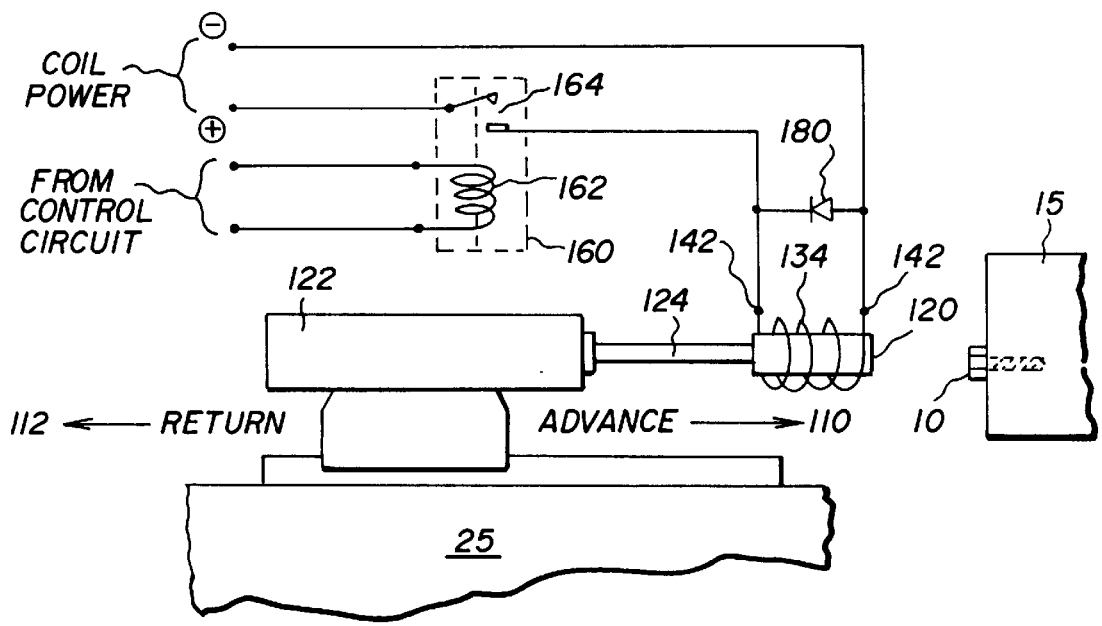
FIG. 2B shows a diagrammatic view of a nutrunner in accordance with the first embodiment of the present invention together with a schematic of a second control circuit therefor.

For the controller 220, an alternative control circuit is shown in FIG. 2B which is usable when residual magnetic field 150 in the socket 120 is not a problem. This alternative uses just the first relay 160. The first relay contact 164 is directly connected to one of the coil terminals 142. A diode 180 is connected in parallel across the coil terminals 142. When first relay 160 is de-energized, and the magnetic field 150 in the socket 120 collapses, a back EMF spike is generated in the coil 134. Since the spike is the reverse polarity, the spike is dissipated across the diode 180.

DETAILED DESCRIPTION AND OPERATION

Referring to FIG. 1, during typical operation, the electromagnetic nutrunner socket collar would be installed on (around) a motor driven socket 120. During a bolt loosening cycle, the motor driven socket assembly would advance in direction 110 moving the socket 120 with the electromagnetic socket collar 130 (FIG. 3) to a position where the socket fits correctly over the bolt 10 on the workpiece 15 on the assembly line 20. The motor 122 (FIG. 1) would then be run in the reverse direction of the bolt thread to loosen the bolt 10. Typically, the motion from the motor 122 to the socket 120 is transferred through an extensible drive shaft 124.

Figure 3:
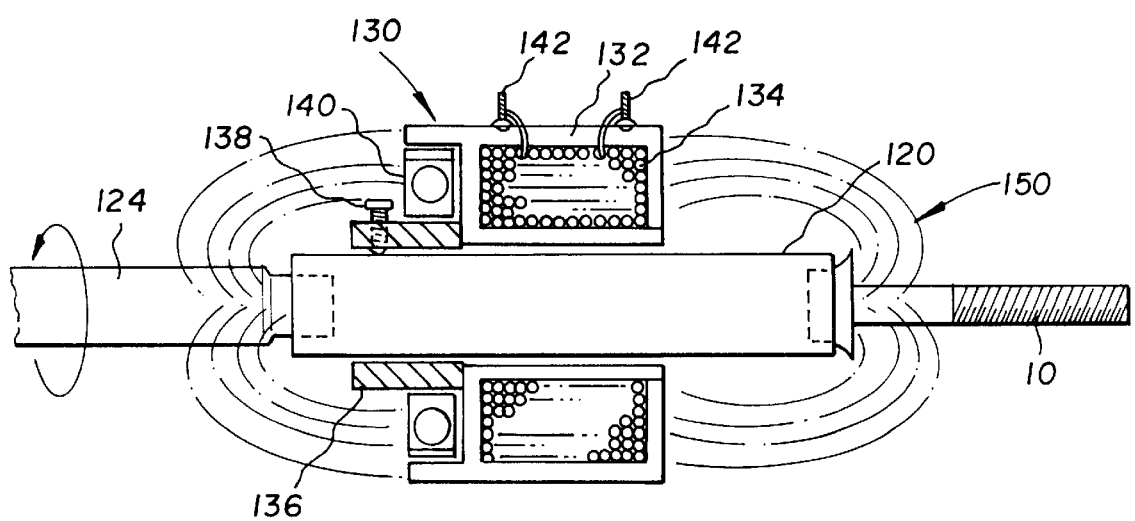
FIG. 3 shows a partial cross-sectional view of the electromagnet structure of the present invention.

As shown in FIG. 3, the electromagnetic nutrunner socket collar 130 is clamped to the socket 120 by a locking sleeve 136 and held in place with a set screw 138. A conventional bearing 140 rides on the outer surface of the locking sleeve 136 and supports and centers the electromagnetic coil 134 in the casing 132 around the socket 120. As the socket 120 rotates, the sleeve 136 rotates inside of the bearing 140. In this way, the socket 120 can rotate freely inside of the electromagnetic coil casing 132 and the coil 134. This configuration eliminates the need for special made sockets because the collar 130 clamps on a standard "off the shelf" socket.

As an alternative, the casing 132 carrying the coil 134 can be clamped by a set screw or the like to the socket 120 and a conventional slip ring assembly can be mounted on the socket closer to the motor 122 for making the necessary electrical connections between the coil 134 and the controller 220.

Once the bolt 10 has been loosened, an electrical current is applied to the magnetic coil 134 by way of electrical terminals 142. An electromagnetic field 150 is generated by the electromagnetic coil 134 in socket 120. The generated magnetic field 150 also flows through the bolt in the socket 120. The motor driven socket assembly then returns or retracts (FIG. 1) in direction 112 with the bolt 10 magnetically coupled to the socket 120. The first relay 160 used to energize the magnetic coil 134 is turned off by removing the control voltage from relay coil 162. The first relay contact 164 then opens, removing the coil power from the electromagnetic coil 134 causing the electromagnetic field 150 to collapse. The socket 120 retains a portion of the magnetic field 150 with the same magnetic polarity as the original electromagnetic field. The relay coil 172 of the neutralizing or second relay 170 is energized by the exterior control circuit operating the second relay contacts 174 which reverses the polarity of the coil power voltage and switches through a current limiting device (resistor) 176 of a predetermined size. First relay 160 is the re-energized by supplying current to first relay coil 162 which closes first relay contact 164, supplying coil power (current) to flow through the current limiting device (resistor) 176, which is in series with the coil 134 of the electromagnetic nutrunner socket collar 130. The current limiting device (resistor) 176 is sized to allow just enough current to flow through the coil 134 to generate a reverse or opposite magnetic field equal to the residual field remaining in the socket 120, cancelling each other. The bolt 10 can then be removed automatically or manually from the socket 120.

Figure 4:
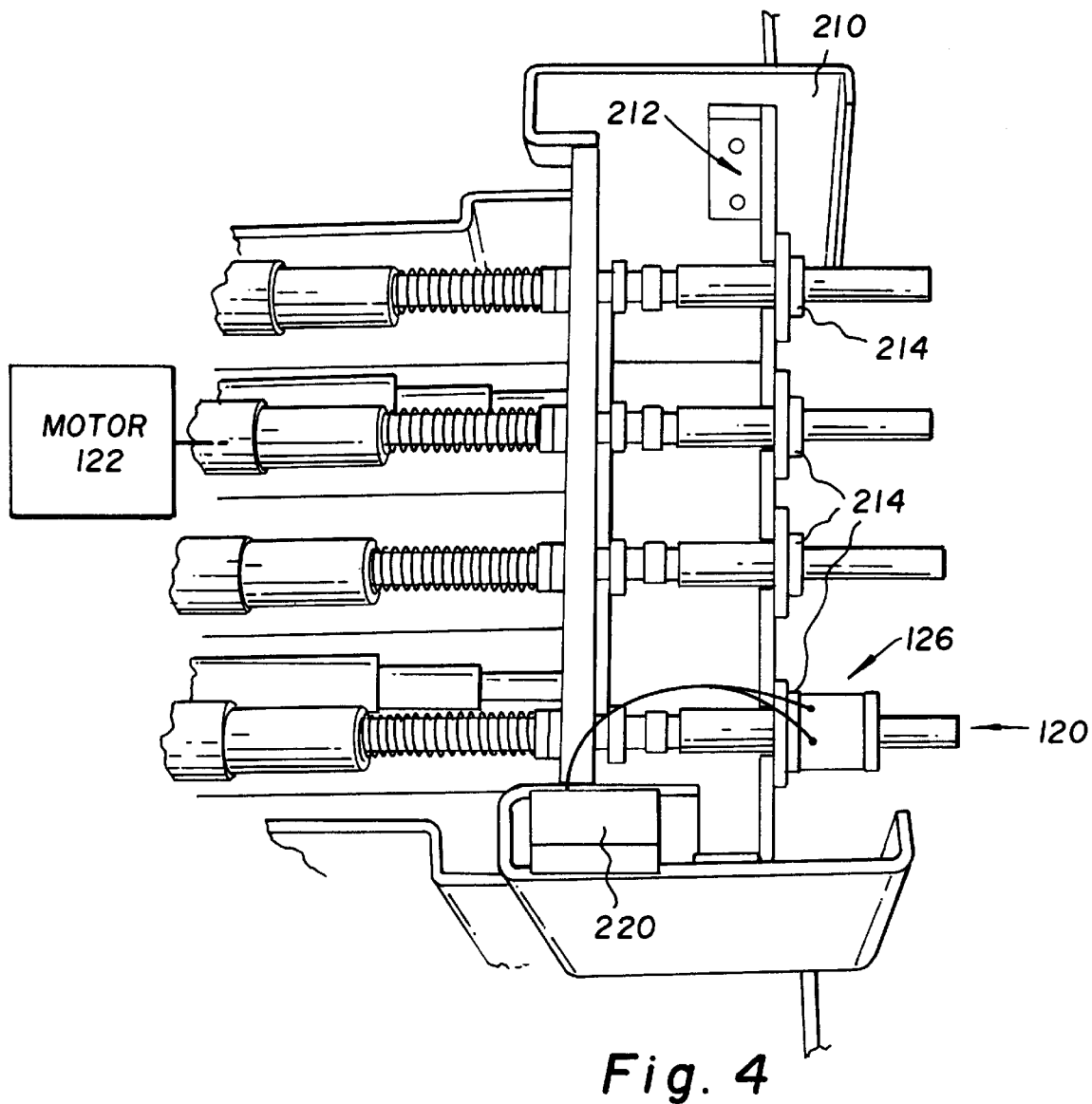
FIG. 4 shows the present invention applied to a plural nutrunner assembly on an assembly disassembly line.

As shown in FIG. 4, the invention can include one or more nutrunners, each of which has an extensible shaft 124 interconnecting the nutrunner motor 122 and the socket 120. A frame 210 can be provided rotatably carrying the socket with the innerconnection to the shaft. The frame 210 itself is movable toward and away from the workpiece 15 on the assembly line 20. A conventional mechanical, hydraulic, or pneumatic system can be provided for moving the frame 210 toward and away from the assembly line 20 the necessary distance for the nutrunner to engage the bolt 10 on the workpiece 15. A mounting bracket 212 can be provided on the frame 210 with a collar mounting flange 214 provided on the bracket 212. The collar mounting flange 214 can surround the socket without contacting the same such that the socket is rotatable within the flange 214. The electromagnet casing 132 of the present invention is directly mounted on the collar mounting flange 214. The controller 220 for the electromagnetic socket collar 130 can be mounted on a different position on the movable frame 210. That is, the electromagnet socket collar 130 and the controller 220 are carried by the frame 210 during movement toward and away from the workpiece. Conventional connections can be provided from the controller 220 to the main control device.

As is readily apparent from FIG. 4, a disassembly device 200 can be provided having a base 25 positioned adjacent to the assembly line. Plural nutrunners can be mounted on the base 25 with each one of the nutrunners comprising a motor 122, a socket 120 having a longitudinal axis, and an extensible shaft 124 interconnecting the motor 122 and the socket 120. A bolt retaining device 126 according to the present invention is provided on the device 200 as above. The socket 120 is chosen to be sized to fit the nut or bolt 10 to be rotated and loosened. Additionally, the forward position of the front of the socket 120 is designed to meet the particular bolt or nut 10 on the workpiece 15 as the workpiece 15 is positioned in front of the device 200 on the assembly line 20. That is to say, different sockets 120 can be positioned at different positions perpendicular to the longitudinal axis of the assembly line depending upon the bolt or nut 10 that is to be removed.

As alternative structures, each one of the controllers 220 for the individual collars 130 can be mounted separately from the movable frame 210 to minimize the amount of weight carried by the frame 210. In this case, conventional flexible electrical connections are provided between the collar 130 and the respective controller 220.

The addition of the present invention to a conventional nutrunner assembly provides a nutrunner especially suited for a disassembly process. In use, the bolt or nut 10 to be removed is not only loosened but completely taken from the workpiece 15 and retained to a point away from the workpiece 15 where additional automated equipment can take over.

Because of the use of an electromagnet, the magnetic field can be turned on and off as required thus enabling simple and easy removal of the bolt or nut from the socket by a collapse of the magnetic field holding the bolt or nut in the socket.

By providing different size coils, the electromagnetic socket collar of the present invention can be particularly designed for the particular socket, nutrunner, and bolt to be removed in the particular application. The collar coils are readily changeable and thus enable relatively simple line changes. In addition, the control circuit of the present invention is particularly designed to not only collapse the magnetic field but also reverse the polarity thereof to neutralize any residual polarity in the socket further simplifying removal of the bolt or nut from the socket.

By the design of the present invention, a special made socket is not required. That is, the present invention enables the use of a standard socket with no modification thereof.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A bolt retaining device for a nutrunner which includes a socket having a longitudinal axis and being sized to fit the bolt, said device comprising an electromagnet positioned with respect to the socket to generate a magnetic field directed along the axis of the socket to hold the bolt in the socket when the field is present, and a controller connected to said electromagnet controlling the magnetic field.

2. The bolt retaining device of claim 1, wherein said electromagnet is a coil co-axially mounted with respect to the socket.

3. The bolt retaining device of claim 2, further comprising a locking sleeve connected to the socket, a rotatable bearing mounted on the locking sleeve, and a casing mounted on said bearing, said electromagnet coil being provided in said casing.

4. The bolt retaining device of claim 1, further comprising a locking sleeve connected to the socket, a rotatable bearing mounted on the locking sleeve, and a casing mounted on said bearing, said electromagnet being provided in said casing.

5. The bolt retaining device of claim 1, wherein said electromagnet is mounted on the socket and said device further comprises a slip ring assembly on said socket electrically interconnecting said electromagnet with said controller.

6. The bolt retaining device of claim 1, wherein said electromagnet comprises a coil surrounding said axis of the socket, and said controller comprises a first relay having first contacts connected in series with said coil, a second relay interposed between said first relay and said coil, and a current limiting device, said second relay has multiple second relay contacts including a first position connecting power from the first relay directly to the coil and a second position reversing polarity of the connection across the coil, said current limiting device being connected in series with the coil when the second relay contacts are in the second position.

7. The bolt retaining device of claim 1, wherein said electromagnet comprises a coil surrounding said axis of the socket, and said controller comprises a first relay having first contacts connected in series with said coil, and a diode connected in parallel with said coil, whereby when said relay is energized, current flows through said coil generating the magnetic field and as said relay is de-energized, said diode prevents arcing across said first contacts from a reverse EMF spike as the magnetic field collapses.

8. A nutrunner for a bolt or nut comprising:
   a motor;
   a socket having a longitudinal axis and being sized to fit the bolt or nut connected to be rotated by said motor; and
   a bolt retaining device for the bolt or nut comprising an electromagnet positioned with respect to the socket to generate a magnetic field directed along the axis of the socket to hold the bolt in the socket when the field is present, and a controller connected to said electromagnet controlling the magnetic field.

9. The nutrunner of claim 8, wherein said electromagnet is co-axially mounted with respect to the socket.

10. The nutrunner of claim 9, further comprising a bracket connected to the socket, a rotatable bearing mounted on the bracket, and a casing mounted on said bearing, said electromagnet being provided in said casing.

11. The nutrunner of claim 8, wherein said electromagnet comprises a coil surrounding said axis of the socket, and said controller comprises a first relay having first contacts connected in series with said coil, a second relay interposed between said first relay and said coil, and a current limiting device, said second relay has multiple second relay contacts including a first position connecting power from the first relay directly to the coil and a second position reversing polarity of the connection across the coil, said current limiting device being connected in series with the coil when the second relay contacts are in the second position.

12. The nutrunner of claim 8, wherein said electromagnet comprises a coil surrounding said axis of the socket, and said controller comprises a relay having contacts connected in series with said coil, and a diode connected in parallel with said coil, whereby when said relay is energized, current flows through said coil generating the magnetic field and as said relay is de-energized, said diode prevents arcing across said contacts from a reverse EMF spike as the magnetic field collapses.

13. The nutrunner of claim 8, further comprising an extensible shaft interconnecting said motor and said socket, a frame rotatably carrying said socket, said frame being movable toward and away from a workpiece, means for moving said frame toward and away from the workpiece, a mounting bracket on said frame, and a collar mounting flange on said bracket, said electromagnet being mounted on said collar mounting flange, said controller being mounted on said frame, said electromagnet and said controller being carried by said frame during the movement toward and away from the workpiece.

14. A disassembly device for removing bolts or nuts from a workpiece on an assembly line, comprising
   a base positioned adjacent the assembly line,
   plural nutrunners mounted on said base, each nutrunner comprising a motor, a socket having a longitudinal axis and being sized to fit the bolt or nut connected to be rotated by said motor, an extensible shaft interconnecting said motor and said socket, and a bolt retaining device for the bolt or nut comprising an electromagnet positioned with respect to the socket to generate a magnetic field directed along the axis of the socket to hold the bolt in the socket when the field is present, and a controller connected to said electromagnet controlling the magnetic field;
   a frame mounted on said base and rotatably carrying said sockets of said plural nutrunners, said frame being movable toward and away from the workpiece,
   means for moving said frame toward and away from the workpiece,
   a mounting bracket on said frame, and
   a plurality of collar mounting flanges on said bracket, each said electromagnet being mounted on one said collar mounting flange, each said controller being mounted on said frame, said electromagnets and said controllers being carried by said frame during the movement toward and away from the workpiece.

15. The disassembly device of claim 14 wherein each said electromagnet is co-axially mounted with respect to a respective said socket.

16. The disassembly device of claim 14 wherein each said device further comprises a locking sleeve connected to the respective socket, a rotatable bearing mounted on the locking sleeve, and a casing mounted on said bearing, said electromagnet being provided in said casing.

17. The disassembly device of claim 14, wherein said electromagnet comprises a coil surrounding said axis of the socket, and said controller comprises a first relay having first contacts connected in series with said coil, a second relay interposed between said first relay and said coil, and a current limiting device, said second relay has multiple second relay contacts including a first position connecting power from the first relay directly to the coil and a second position reversing polarity of the connection across the coil, said current limiting device being connected in series with the coil when the second relay contacts are in the second position.

* * * * *